J. GIRARD.
PNEUMATIC TIRE.
APPLICATION FILED JULY 17, 1915.

1,202,991.

Patented Oct. 31, 1916.

WITNESSES

INVENTOR
J. Girard.
Attorney

UNITED STATES PATENT OFFICE.

JOSEPH GIRARD, OF MONTREAL, QUEBEC, CANADA.

PNEUMATIC TIRE.

1,202,991.  Specification of Letters Patent.  Patented Oct. 31, 1916.

Application filed July 17, 1915. Serial No. 40,514.

*To all whom it may concern:*

Be it known that I, JOSEPH GIRARD, a subject of the King of Great Britain, and residing at Montreal, in the Province of Quebec, in the Dominion of Canada, have invented certain new and useful Improvements in Pneumatic Tires; and I do hereby declare that the following is a full, clear, and exact description of the same.

The invention relates to a pneumatic tire, for vehicle wheels as hereinafter fully described with the aid of the accompanying drawings in which—

Figure 1:
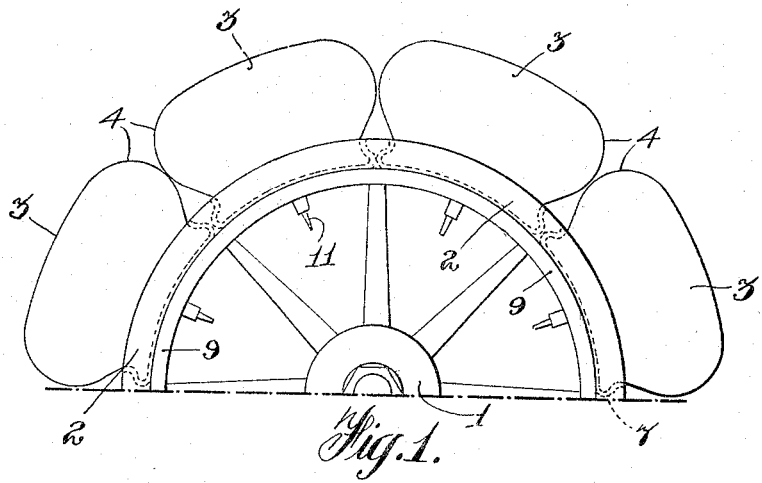
Figures 2, 3:
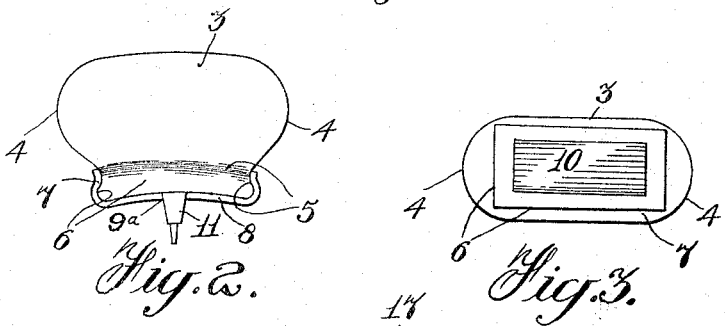
Figure 4:
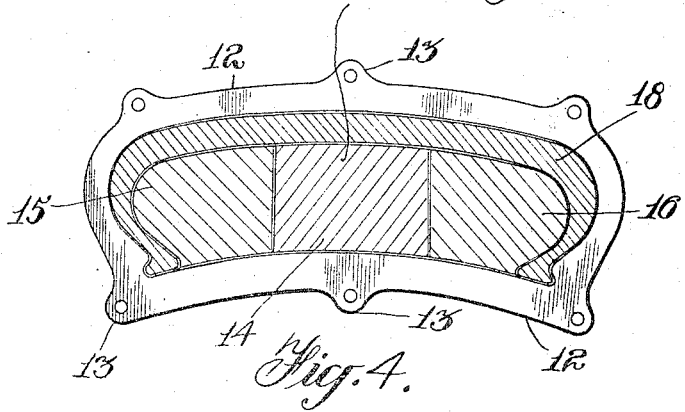

Figure 1 is a side elevation of one half of the wheel with a tire according to the invention. Fig. 2 is a side elevation of one independent section secured on the special rim. Fig. 3 is a plan view of the underside of one section, the special rim having been removed. Fig. 4 is an enlarged cross section longitudinal view through one of the sections in its mold showing how it is made.

The object of the invention is to provide a pneumatic tire composed of a series of integral sections independent from one another, so that if a puncture happens, it will be necessary to remove only the punctured section, whereas it will easily be removed and replaced by a new section thus economizing on the cost of the tire.

Another object is to produce a pneumatic tire that will be hardly more expensive to manufacture than an ordinary tire.

Reference being had to the accompanying drawings for a fuller explanation of the invention, 1 indicates an ordinary wheel having a rim 2 to which each section 3 according to the invention is attached. The sections 3 which are integral and suitably spaced from one another are equally disposed on the periphery of the wheel and are preferably of an oblong shape and round at their ends 4 and have at their lower part the annular depression 5 and projection 6 forming all around the lower part of the section a grip, as in ordinary tires, the sides of which engage in the rim 2. The gripping ends 7 which are similar to those on the side are rigidly held in place by a flat strip of metal 8, bent at each of its ends to engage and secure the ends 7 of the sections. This clenching strip 8 fits snugly within the rim 2 and lies flat on the felly 9.

9ª is an orifice in the strip 8 to introduce the air valve of the tire.

10 is an orifice to introduce the inflatable tube which is of the same shape as the section 3 and 11 are the ordinary air valves, one for each section.

To avoid friction, a suitable space must be left between each section.

In Fig. 4 is disclosed the method of making the section which consists in an outer casing or mold 12 of an elongated shape, split in half, each segment being provided with suitable means 13 to rigidly secure the segments together and 14 is the core divided in two outer sections 15 and 16 and the central or key section 17. The core 14 is of the same shape as the inside of an ordinary tire except that the ends are round, and the inner side of the casing 12 is identically the same shape as the section illustrated in Fig. 2.

18 is the section tire compressed, and shown as it appears in the mold.

In order that the process of making this sectional tire may be better understood, the operation of manufacture will be explained. First of all, the casing 12 is taken apart by removing the bolts or any other suitable means that pass through the perforated lugs 13 and hold it tightly together; the core 14 is then removed and the rubber or material is placed within the casing; the sections 15 and 16 are pressed in their respective places and the central or key core 17 is placed between said cores 15 and 16, thus compressing the material within the casing. The tire is then subjected to the well known method now employed in the manufacture of tires.

What I claim is:—

In a pneumatic tire, a series of integral sections disposed around the periphery of a wheel, each independent from one another and having an enlarged outer surface, the lower part of said section being circumferentially grooved, a rectangular aperture in the bottom of said section to introduce the inner or air tube which is provided with a valve, a strip of metal under said rectangular surface, the ends of which are bent inwardly in order to grip the annular groove in the outer ends of said sections, said strip being provided with an orifice for the air valve to pass through, and a rim around the wheel engaging the lateral grooves in the section, substantially as described.

Signed at Montreal, Quebec, Canada, this 19th day of June, 1915.

JOSEPH GIRARD.

Witnesses:
M. PATENAUDE,
C. LEFEBVRE.

Copies of this patent may be obtained for five cents each, by addressing the "Commissioner of Patents, Washington, D. C."